(No Model.)
B. C. MAY.
CHURN MOTOR.
No. 265,333. Patented Oct. 3, 1882.
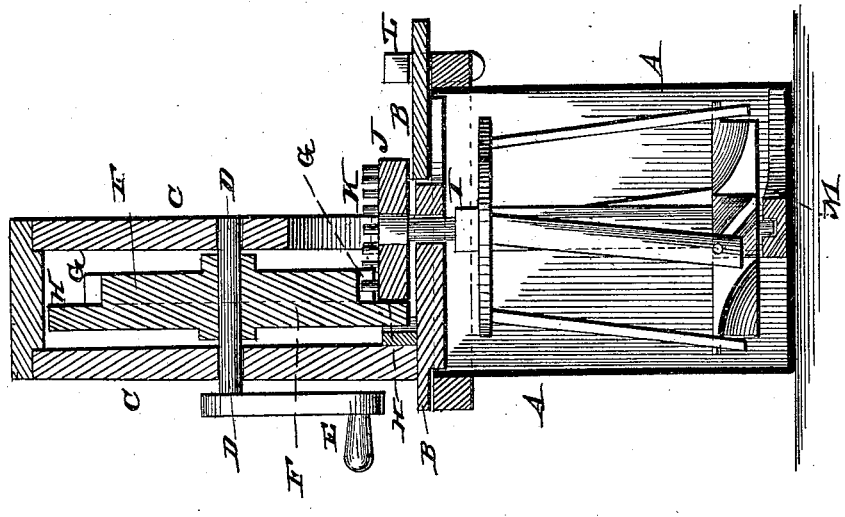
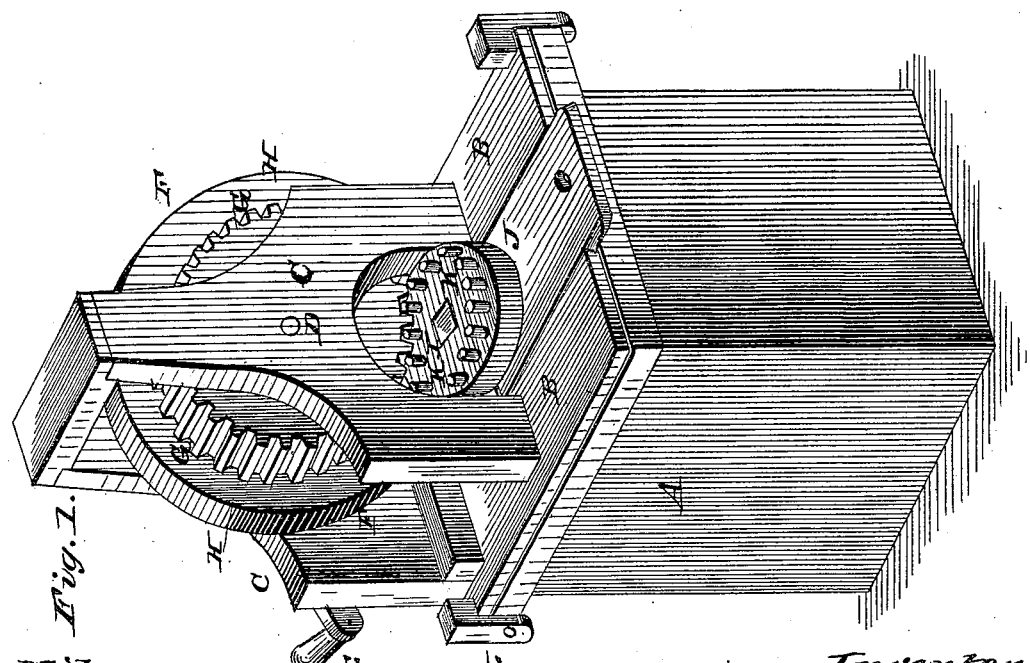
Witnesses:
Phil. C. Fetrich.
C. K. Allen.
Inventor:
B. C. May
by C. A. Snow & Co.
Attorneys.

UNITED STATES PATENT OFFICE.

BENJAMIN C. MAY, OF POTTSVILLE, TEXAS.

CHURN-MOTOR.

SPECIFICATION forming part of Letters Patent No. 265,333, dated October 3, 1882.

Application filed August 4, 1882. (No model.)

*To all whom it may concern:*

Be it known that I, BENJAMIN C. MAY, of Pottsville, in the county of Hamilton and State of Texas, have invented certain new and useful Improvements in Churn-Motors; and I do hereby declare that the following is a full, clear, and exact description of the invention, which will enable others skilled in the art to which it appertains to make and use the same, reference being had to the accompanying drawings, which form a part of this specification.

Figure 1 is a perspective view, and Fig. 2 is a vertical sectional view.

Similar letters of reference indicate corresponding parts in both figures.

This invention relates to churn-motors or operating devices; and it consists in certain improvements in the construction of the same which will be hereinafter fully described, and particularly pointed out in the claims.

In the drawings hereto annexed, A represents the churn box or body, and B the cover of the same, upon which the operating mechanism is located. The construction of said mechanism is as follows:

C C are two uprights mounted on the cover B, and having bearings for a transverse shaft, D, having a crank, E, which may be operated by hand or by a treadle, or in any suitable manner. The shaft D carries a large wheel or disk, F, having teeth G at its periphery, and provided on its inner side with a broad flange, H, extending beyond the teeth, as shown, for purposes which will be presently described. The cover B has an opening or bearing for the vertical dasher staff or shaft I, which carries at its upper end a disk, J, the edge or periphery of which bears tightly against the flange H of disk F. Disk J is also provided with upward-projecting studs K, engaging the teeth G of disk F, so as to be driven thereby. The cover B is to be secured upon the churn-box A by means of pivoted clamps L. The shaft or staff I has a suitably-constructed dasher, and its lower end may be journaled in a cross-piece, M, placed diagonally in the bottom of the churn-box.

It will be seen that in operation the shaft I is driven by means of the wheel F, the teeth G of which engage the studs K of disk J upon said shaft. It is found, however, that when in devices of this class the shaft or staff is driven by cog-gear only the operation is not satisfactory, because, owing to the nature of the device, the bearings for the shaft are necessarily frail, causing the parts to rattle and frequently to break down. I therefore supplement the cog-gear with friction mechanism, consisting of the flange H, engaging the edge of disk J, which prevents slack and slipping and causes the operation to be even and steady. The construction is simple, no parts being necessary but those employed in ordinary cog-gear, the construction being as described.

I claim and desire to secure by Letters Patent of the United States—

1. The combination, with a wheel or disk having a toothed periphery and provided with a broad friction-flange, of a disk at right angles to the former, bearing against its friction-flange, and having studs engaging its teeth, as set forth.

2. In a churn-motor, the combination, with the box or body, of the cover B, having uprights C, shaft D, having crank E, disk F, having teeth G and flange H, and the vertical shaft I, having disk J, provided with studs K, all constructed and operating substantially as set forth.

In testimony that I claim the foregoing as my own I have hereto affixed my signature in presence of two witnesses.

BENJAMIN CARY MAY.

Witnesses:
WILLIAM HARRISON POTTS,
LEMUEL S. BRATTON.